United States Patent [19]

Abbott et al.

[11] Patent Number: 5,711,049

[45] Date of Patent: *Jan. 27, 1998

[54] WIPER BLADE ASSEMBLY

[75] Inventors: Barry James Abbott; Valerie Margaret Abbott, both of Belgrave; Stephen James Clarke; Dino Donchi, both of Ringwood, all of Australia

[73] Assignee: Clean Screen Wipers Pty Ltd., Boronia, Australia

[*] Notice: The term of this patent shall not extend beyond the expiration date of Pat. No. 5,513,414.

[21] Appl. No.: 589,639

[22] Filed: Jan. 22, 1996

Related U.S. Application Data

[63] Continuation of Ser. No. 163,437, Dec. 8, 1993, Pat. No. 5,513,414.

[30] Foreign Application Priority Data

Sep. 24, 1993 [AU] Australia .................. PM1412

[51] Int. Cl.6 .................. B60S 1/04; B60S 1/38
[52] U.S. Cl. .................. 15/250.454; 15/250.451; 15/250.48
[58] Field of Search .................. 15/250.41, 250.361, 15/250.4, 250.31, 250.454, 250.453, 250.457, 250.451, 250.48, 250.43

[56] References Cited

U.S. PATENT DOCUMENTS

| | | | |
|---|---|---|---|
| Re. 29,392 | 9/1977 | Moorhead et al. | 15/250.42 |
| 2,983,945 | 5/1961 | De Pew | 15/250.454 |
| 3,153,254 | 10/1964 | Lenz et al. | 15/250.454 |
| 3,626,544 | 12/1971 | Lopez et al. | 15/250.454 |
| 3,822,577 | 7/1974 | Roberts | 72/379 |
| 3,879,794 | 4/1975 | Roberts | 15/250.42 |
| 3,885,265 | 5/1975 | Deibel et al. | 15/250.42 |
| 3,911,523 | 10/1975 | Harbison et al. | 15/250.42 |
| 4,271,558 | 6/1981 | D'Alba | 15/250.454 |
| 4,388,742 | 6/1983 | Kimber et al. | 15/250.42 |
| 4,566,147 | 1/1986 | Baerenwald et al. | 15/250.42 |
| 4,930,180 | 6/1990 | Longman | 15/250.42 |
| 4,993,103 | 2/1991 | Takahashi et al. | 15/250.42 |
| 5,150,498 | 9/1992 | Charng | 15/250.42 |
| 5,235,721 | 8/1993 | Charng | 15/250.42 |
| 5,513,414 | 5/1996 | Abbott et al. | 15/250.454 |

FOREIGN PATENT DOCUMENTS

| | | | |
|---|---|---|---|
| 33585 | 3/1973 | Australia . | |
| 64935 | 6/1981 | Australia . | |
| 38262 | 8/1985 | Australia . | |
| 629785 | 10/1992 | Australia . | |
| 2692856 | 12/1993 | France | 15/250.451 |

*Primary Examiner*—Gary K. Graham
*Attorney, Agent, or Firm*—Baker & Daniels

[57] ABSTRACT

A backing strip for a windscreen wiper blade assembly, and a clip for securing the backing strip to the assembly are disclosed. The backing strip and clip may be used in a wiper refill replacing existing windscreen wiper blades or may be provided as original equipment. The backing strip comprises rails (20) and (22) which can be engaged with claws (12) of the wiper assembly. The backing strip has two channels (34) and (36) for receiving a wiper element (40) and either rails (20) or (22) can be engaged with the claws depending on the size of the claws. The wiper element (40) is arranged in an appropriate one of the channels (34, 36) depending on which of the rails (20, 22) are engaged with the claws. The backing strip may include a third pair of rails (102) for enabling the backing strip to be used with claws of three different sizes. A clip (50) is disclosed for retaining the backing strip to the assembly and comprises first and second pairs of legs (54) and (56) which are spaced apart different distances corresponding to the rails (20) and (22), the legs (54) and (56) have prongs (58) which engage behind the claws (12) to limit longitudinal movement of the backing strip relative to the claws (12).

21 Claims, 14 Drawing Sheets

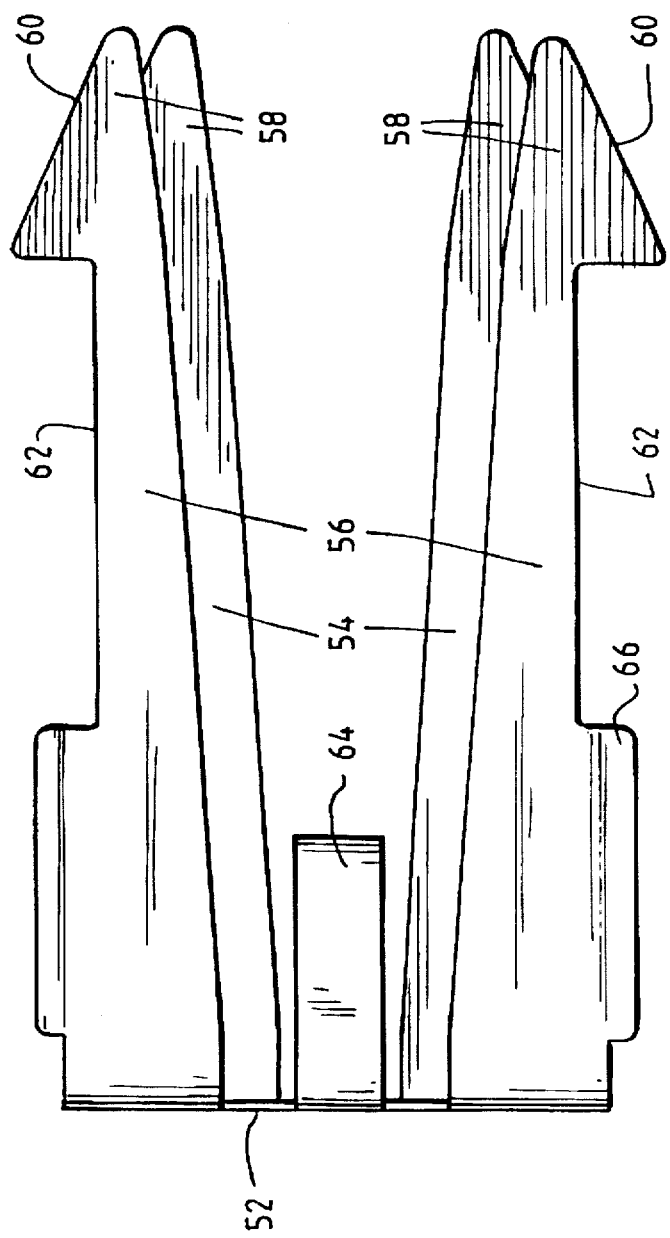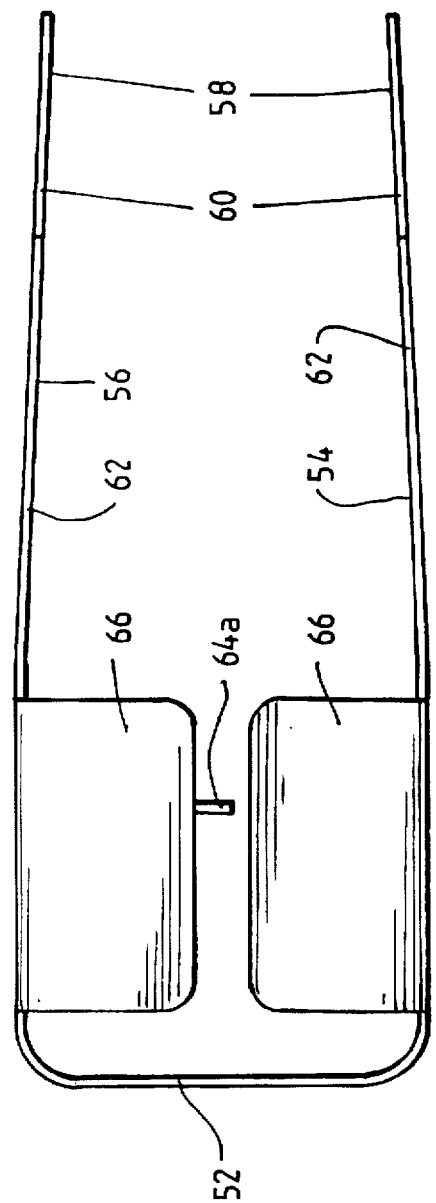

WIPER BLADE ASSEMBLY

This is a continuation of application Ser. No. 08/163,437, filed Dec. 8, 1993 now U.S. Pat. No. 5,513,414.

BACKGROUND OF THE INVENTION

This invention relates to a backing strip for a windscreen wiper blade assembly and a wiper blade clip.

The dramatic changes that have occurred in automotive and vehicular windshield/windscreen designs worldwide for improved aerodynamics and expanded visibility has created a profusion of windshield wiper refill lengths that has caused refill manufacturers to produce refills in sizes of:

8.0"; 8.2"; 8.5"; 9.0"; 9.5"; 9.75"; 10.0"; 10.25"; 10.5"; 11.0"; 11.25"; 11.5"; 12.0"; 12.5"; 12.875"; 13.0"; 13.5"; 13.875"; 14.0"; 14.25"; 14.5"; 14.875"; 15.0"; 15.5"; 15.9"; 16.0"; 16.25"; 16.5"; 16.75"; 16.875"; 17.0"; 17.5"; 18.0"; 18.25"; 18.5"; 18.75"; 18.875"; 19.0"; 19.5"; 19.875"; 20.0"; 20.5"; 21.0"; 21.5"; 22.0"; 22.25"; 22.5"; 23.0"; 23.5"; 24.0"; 24.25"; 24.5"; 24.875"; 25.0"; 25.5"; 26.0"; 26.875"; 27.0"; 27.9"; 28.0"; 28.5"; 32.0"; 39.0"; 40.0";

and lengths in between and beyond and the metric equivalents of these lengths. The most common length for passenger motor vehicles, covering virtually 95% of all users, range from 8.0" to 24.0".

Manufacturers of windshield wiper blade frames or superstructures, whether from the motor vehicle original equipment industry or from the automotive aftermarket industry, have created further profusion in the manufacture of refills by producing blade frames having straddling claws of many and varied widths, with some blade frames having a fairly consistent width of claws over the length of frame and some having multiple widths of claws in the same frame. This multitude of frames require refills in widths of 3.95 mm; 4.0 mm; 4.5 mm; 4.75 mm; 4.9 mm; 5.0 mm; 5.25 mm; 5.5 mm; 6.0 mm; 6.1 mm; 6.3 mm; 6.5 mm; 7.0 mm; 8.0 mm; 8.1 mm; 8.3 mm; 8.5 mm; 9.0 mm; 9.4 mm; 9.5 mm; 10.5 mm; 10.67 mm; 11.0 mm; 11.56 mm; 11.94 mm; 12.5 mm; 13.5 mm; 14.48 mm; 14.5 mm; 15.0 mm; 15.24 mm; 16.0 mm; 17.78 mm; 18.8 mm; 20.57 mm; and widths in between and beyond and the American/Imperial equivalents of these widths. The most common widths for passenger motor vehicles, covering virtually 95% of all users, range from 6.0 mm to 13.5 mm.

All these lengths and widths have made manufacturing and stock keeping units (SKU's) particularly onerous, expensive and wasteful and has negated and impacted unfavourably on the use and application of wiper blades and refills. It has in fact caused the motorist(s) to replace their wipers less often because of confusion on the motorist's part and difficulty in choice and fit to the impairment of visibility and safety. It has also forced the motorist, in some circumstances, to purchase from the motor vehicle dealer the original equipment refill specifically made for that frame at a much higher price than an aftermarket supplier would need.

A recent survey undertaken at two international automotive parts trade shows revealed the extent of the problem:

Manufacturer "A" 19 Different Refills
Manufacturer "B" 48 Different Refills
Manufacturer "C" 20 Different Refills
Manufacturer "D" 22 Different Refills Some attempt to overcome the difficulty of multitudes of widths has been made by the use of a spreader that will widen metal claws to accept the available refill. A danger here is that the claws may break, making the system unsafe. Plastic frame claws cannot be widened.

Various other refills have been produced that claim to be multifit or universal. Generally, these are designed to fit only two widths, being nominal 6 mm and nominal 8 mm but not being able to fit nominal 9.5 mm wide claws, this latest width being common on later American-made vehicles. Further, widths of 12.5 mm and more for heavy duty trucks and for buses have not been catered for by existing universal refills. One universal refill has snap off rails. These may inadvertently break in operation.

One problem experienced with other multifit-type refills is that they utilise a removable, replaceable retention clip. This clip could be dropped by the motorist and lost, causing the refill to be unusable. The clip could also be improperly refitted, causing dislodgment in operation, with the danger being that the refill could slide out of the frame, causing a loss of driving vision and damage by the frame to the glass and windshield surrounds.

Certain refills incorporate a plastic retention clip. These clips tend to be easy to dislodge and, in hot weather, can deform and soften. This leads to the clip not locating on the claw, causing the refill to slide out of the claws, resulting in loss of vision and damage to the glass and windshield surrounds. Some clips only have one retention arm, thereby halving the holding strength. Some clips also have the retention arm/s locating outside the claw. These clips may become dislodged during manual cleaning of the vehicle and when the vehicle is in an automatic car wash.

Some metal clips are made from metals containing iron which, if not carefully treated, results in a rusted clip and weakness in retention. Still further metal clips have been produced across the grain of the metal instead of along the grain. These made across the grain have little spring inherent in them, do not hold sufficiently well and can deform and break in installation and operation.

Another problem experienced by other designs of multifit refills is that the space available in the internal cavity of the claws has been insufficient and has caused the uppermost unutilised rails to bind up or create so much friction and tight fit that the backing strip cannot be threaded or that, once threaded, the backing strip is now so inflexible that it will not conform to the curvature of the glass, thus giving an improper and patchy wipe. This produces an unsafe driving condition. The situation becomes exacerbated with modern vehicles with aerodynamic windshields as the wiper must also cope with up to 1000 different angles/radii during one cycle of travel over a windshield. Radii of windshields and blades have been measured at 350 mm; 430 mm; 474 mm; 500 mm; 525 mm; 583 mm; 592 mm; 600 mm; 630 mm; 632 mm; 663 mm; 665 mm; 730 mm; 750 mm; 796 mm; 800 mm; 867 mm; 956 mm; 1000 mm; 1130 mm; 1169 mm; 1300 mm; 1500 mm; 1540 mm; 1873 mm; 2000 mm; 2500 mm; and nominal infinity for nominal flat glass.

A further difficulty experienced with original equipment and aftermarket refills is the difficulty experienced, at times, with some retention methods, where coins or pliers are needed to remove the refill. As well as the inconvenience of having the implements at hand, the possibility exists of damage to the frame and the glass. Some refills must be cut whilst in the frame prior to removal. This raises the possibility of the installer being harmed.

Certain replacement refills have a backing strip made from various metals. These have the inherent danger of being sharp on the edges which are gripped by the installer in removing and replacing, leading to lacerated fingers and thumbs. Additionally, there can be a tendency for the metal of the claw becoming exposed to the metal backing strip, leading to rusting/oxidation at the point of contact.

Some refills incorporate two loose metal flexors which, when located in pockets in the squeegee, can be difficult to remove and may cause damage to the frame in the process. When installing a new refill of this type, considerable skill and patience is required to keep a firm grip on three loose components at the same time and to carefully thread these in unison along the full length of the frame.

A further problem with other types of refills is that the frames on older vehicles may have claws that have been spread over a period of time and use, necessitating the squeezing of claws to fit a narrower pair of rails. This raises the possibility of breakage. Additionally, some refill rails are too thick in the wall section to accept certain thicknesses of claw material. If an unsuitable refill is forced to fit, it becomes too rigid to adequately and flexibly wipe the glass.

SUMMARY OF THE INVENTION

What is needed to solve the myriad of problems described above is a universal fit replacement wiper refill unit that can be cut and/or adjusted to the exact length and width to fit wiper blade superstructures, whether of continuous or multiple claw design.

The backing strip will fit new and used wiper claws of frames for American, Japanese, British, European, South Korean, Malaysian and Australian and other vehicles, whether original equipment or aftermarket.

The unique design of the wiper blade element will offset variations in operation and screen angles and wiper arm spring pressure and wear and tear/deterioration in wiper mechanisms and will resist "set" and avoid scratching of the glass and avoid the touching of the metal/rubber windshield surrounds.

A unique double sided retention clip is required to hold the refill to the great variety of original equipment and aftermarket wiper blade superstructures, whether they are in good order or not, and to aid the ease of fitting and removal of this refill.

The backing strip is required to continuously hold the wiper rubber under sufficient pressure across its full length for the full operation of the wiping system in all directions against windshields of varying lengths, widths, angles and curvatures in all driving conditions in order for the wiper to give clear and safe visibility to the motorist for a sufficiently long period of time. The backing strip must remain flexible, yet strong, and must resist cracking, ultraviolet deterioration, ozone deterioration, weathering, ageing, heat, impact, acid rain, chemical contamination etc.

In a first aspect the invention provides a windscreen wiper blade assembly clip for a windscreen wiper blade assembly having a blade frame including plural pairs of opposed claws, a backing strip having first and second channels for alternatively receiving a wiper blade element, the backing strip having a first pair of rails which include longitudinal edges spaced apart by a first predetermined distance and a second pair of rails having longitudinal edges spaced apart by a second predetermined distance which is greater than the first predetermined distance, the backing strip being coupleable to the blade frame by engaging either the first or second pair of rails with the opposed claws depending on the size of the opposed claws, and by the blade element being located in the first or second channels dependent upon which of the first or second pair of rails are engaged with the opposed claws, said windscreen wiper blade assembly clip including:

a base section for location at an end of the backing strip;

a first pair of legs coupled to and extending transverse to the base section and adapted to overlie the first pair of rails of the backing strip, the first pair of legs being spaced apart by a first predetermined distance;

a second pair of legs coupled to and extending transverse to the base second and being opposed to the first pair of legs, the second pair of legs being adapted to overlie the second pair of rails, the second pair of legs being spaced apart a second predetermined distance which is greater than the first predetermined distance at which the first pair of legs are spaced;

abutment members on each of the first and second pair of legs;

attachment means for attaching the clip to the backing strip; and wherein dependent on which of the first or second rails are engaged with the opposed claws, the first or second pair of legs which overlie that pair of rails are, in use, engaged with one pair of the opposed claws by location of the abutment members behind said one pair of opposed claws to secure the backing strip to the one pair of opposed claws to limit longitudinal movement of the backing strip relative to the opposed claws.

The invention also provides a backing strip for a windscreen wiper blade assembly, the windscreen wiper blade assembly having a blade frame including pairs of opposed claws, the backing strip including:

first and second channels for alternatively receiving a wiper blade element, the backing strip having a first pair of rails which include longitudinal edges spaced apart by a first predetermined distance and a second pair of rails having longitudinal edges spaced apart by a second predetermined distance which is greater than the first predetermined distance, the backing strip being coupleable to the blade frame by engaging either the first or second pair of rails with the opposed claws dependent upon the size of the opposed claws, and by the blade element being located in the first or second channel dependent upon which of the first or second pair of rails are engaged with the opposed claws;

a first clip arranged at one end of the backing strip and having a pair of legs which overlie the first pair of rails, the legs being spaced apart by a first predetermined distance;

a second clip arranged at the other end of the backing strip and having a pair of legs which overlie the second pair of rails, the second pair of legs being spaced apart by a second predetermined distance which is greater than the first predetermined distance at which the first legs are spaced apart;

abutment members on each of the first and second pair of legs of the first and second clips; and wherein dependent upon which of the first or second pair of rails are engaged with the opposed claws, the legs of the first or second clip which overlie that pair of rails are engageable with one of the opposed pair of claws so that the abutment members are arranged behind the said one of the pair of opposed claws to secure the backing strip to the one pair of opposed claws to limit longitudinal movement of the backing strip relative to the opposed claws.

The invention still further provides a backing strip for a windscreen wiper blade assembly which assembly includes plural pairs of opposed claws for engaging the backing strip and holding the backing strip in the blade assembly, said backing strip comprising:
- a first pair of rails having longitudinal side edges which are spaced apart by a first predetermined distance;
- second pair of rails which have longitudinal edges spaced apart by a second predetermined distance; and
- a third pair of rails which have longitudinal side edges spaced apart by a third predetermined distance.

The invention still further provides a backing strip and clip combination for a windscreen wiper blade assembly which has opposed claws for receiving the backing strip, including:
- a backing strip having at least first and second pairs of rails for engaging the opposed claws of the windscreen wiper blade assembly;
- a clip arranged at one end of the backing strip and having;
  a) a base section for location at the end of the backing strip;
  b) a first pair of legs overlying the first pair of rails of the backing strip, a second pair of legs overlying the second pair of rails, and an attachment tongue for engaging the backing strip and securing the clip to the backing strip; and
- wherein the clip is held firmly to the backing strip by the base section which prevents substantial movement of the clip relative to the backing strip in a first direction parallel to the longitudinal direction of the backing strip, the attachment tongue which prevents substantial movement of the clip away from the backing strip in a direction opposite the first direction, the first pair of legs which prevent substantial movement of the clip in a third direction perpendicular to the longitudinal direction of the backing strip, and the second pair of legs which prevent substantial movement of the clip in a fourth direction perpendicular to the longitudinal axis of the backing strip and opposite to the third direction.

The invention still further provides a backing strip and clip combination for a windscreen wiper blade assembly having a blade frame including plural pairs of opposed claws, the backing strip having first and second channels for alternatively receiving a wider blade element, the backing strip having a first pair of rails which include longitudinal edges spaced apart by a first predetermined distance and a second pair of rails having longitudinal edges spaced apart by a second predetermined distance which is greater than the first predetermined distance, the backing strip being coupleable to the blade frame by engaging either the first or second pair of rails with the opposed claws depending on the size of the opposed claws, and by the blade element being located in the first or second channels dependent upon which of the first or second pair of rails are engaged with the opposed claws, said windscreen wiper blade assembly clip including:
- a first pair of legs overlying the first pair of rails of the backing strip, the first pair of legs being spaced apart by a first predetermined distance;
- a second pair of legs opposed to the first pair of legs, the second pair of legs overlying the second pair of rails, the second pair of legs being spaced apart a second predetermined distance which is greater than the first predetermined distance at which the first pair of legs are spaced;
- abutment members on each of the first and second pair of legs;
- attachment means for attaching the clip to the backing strip; and
- wherein dependent on which of the first or second rails are engaged with the opposed claws, the first or second pair of legs which overlie that pair of rails are, in use, engaged with one pair of the opposed claws by location of the abutment members behind said one pair of opposed claws to secure the backing strip to the one pair of opposed claws to limit longitudinal movement of the backing strip relative to the opposed claws.

The two most common widths available throughout the world are nominal 6 mm for Japanese, Korean and European passenger vehicles and nominal 8 mm for American, British and Australian passenger vehicles and many trucks/lorries/buses/forklifts/trains/planes/marine craft from a variety of countries. The third most common width is 9.5 mm nominal for various American cars manufactured over the last three years. Our backing strip has the features of three rails with one being nominal 6 mm and wider or narrower but fixed and one being nominal 8 mm and wider or narrower but fixed and the central rail being the widest and infinitely adjustable from 14.5 mm nominal and wider or narrower to trimline down to 9.4 mm nominal and wider or narrower. The central rail will always be the widest of the three rails and can be used for all sizes where custom shaping or sizing is necessary to permit and promote effective, smooth, streak-free wiping. This central rail can have trimlines of 9.0 mm; 9.1 mm; 9.2 mm; 9.3 mm; 9.4 mm; 9.5 mm; 10.0 mm; 12.5 mm; 14.5 mm and wider and narrower. The backing strip will, because of design, compound and manufacture, remain very strong under all operating conditions and, with the score lines or trim lines, these lines will not be detrimental to this strength but will have the added advantage of allowing flexibility in fitting tight claws.

The backing strip is made or could be made using a variety of moulded or extruded plastics or other material of varying compositions, densities and admixtures to resist weathering and chemical contamination, reduce the tendency for adverse or negative wiper "set" and impart the needed strength, resilience and flexibility to promote the smooth wiper operation. An added significant advantage of this spline design incorporating the double clip is that it may be cut to the exact length to fit the superstructure. A still further advantage is that it may be coloured or left clear. If left clear, it may partly assist with a clearer view for the motorist, thereby improving safety.

Previously retaining clips which heretofore could only be attached to interact with one specific set of rails at a time, frequently became dislodged, distorted, or fractured. The double-sided clip of the present invention can be made from durable, non-corrosive stainless steel, can be engaged in the multiple widths of wiper blade frame claws, as previously listed, regardless of which width rails of the backing strip are being used and, by enveloping the entire profile at one end of the backing strip once securely attached to the backing strip, resists being dislodged or distorted to a far greater extent than one-sided clips. It will double the holding strength of clip to backing strip.

The double clip does not require removement from the refill to enable another set of rails to be used. It is permanently fixed, thereby avoiding improper re-fitting by the motorist or loss by the motorist.

The wiper blade element of the present invention can have a square or rectangular or round or triangular or domed retention/threading bead to provide sufficient interference in the backing strip cavities to avoid being forced out sideways but to also be longitudinally removable by the motorist and

7 to be re-threaded into another backing strip cavity, both cavities having suitable retention serrations pointing into the cavities to allow more than sufficient holding force to hold the squeegee in place during operation of the wiping system without the squeegee being forced out longitudinally or laterally.

DESCRIPTION OF THE PREFERRED EMBODIMENT

Preferred embodiments of the invention will be described, by way of example, with reference to the accompanying drawings in which:

FIG. 3 is a top view of the clip of FIG. 2;

FIG. 4 is a side view of the clip of FIG. 2;

Figure 1:
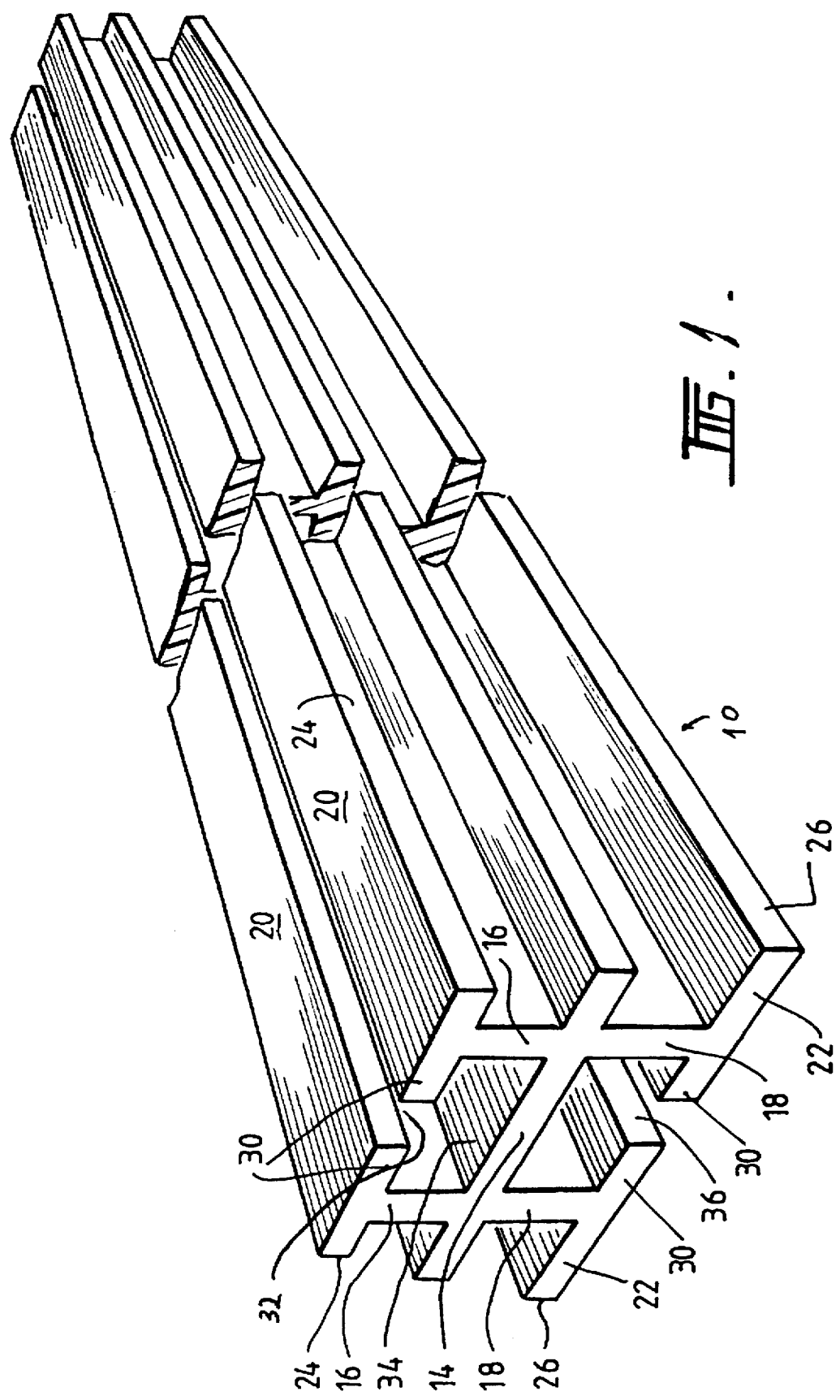
FIG. 1 is a perspective view of a backing strip according to the preferred embodiment of the invention.

With reference to FIG. 1, a backing strip 10 is shown which is to be engaged with claws 12 (see FIGS. 5 and 6) of a vehicle windscreen wiper blade assembly.

As is well known, windscreen wiper blade assemblies include a blade frame (not shown) which is coupleable to a pivot shaft (not shown) of a motor (not shown) for driving the blade assembly to wipe a vehicle windscreen (not shown). The blade fame supports a plurality of the opposed claws 12 on articulated levers which are carried by the blade frame. This structure is well known and therefore will not be described in further detail. The opposed claws 12 are generally aligned with one another in a direction transverse to the longitudinal axis of the backing strip 10. However, it should be understood that the reference to opposed claws in this specification is also intended to cover arrangements where the claws 12 are staggered with respect to one another.

The backing strip 10 according to the preferred embodiment of the invention has a centre web 14. A first pair of arms 16 extend perpendicular to the web 14 in a first direction and a second pair of arms 18 extend perpendicular to the web 14 in a second direction opposite to the first direction. The ends of the first pair of arms 16 support a first pair of rails 20 and the ends of the second pair of arms 18 support a second pair of rails 22. The first and second pair of rails 20 and 22 have longitudinal edges 24 and 26 respectively. The longitudinal edges 24 of the first pair of rails are spaced apart a first predetermined distance and the

8 longitudinal edges 26 of the second pair of rails 22 are spaced apart a second predetermined distance which is greater than the first predetermined distance.

The first and second pair of rails 20 and 22 have inwardly extending flanges 30 which, between respective pairs of the flanges 30, define restricted entrance slots 32. A first channel 34 and a second channel 36 are respectively defined by the centre web 14 and first pair of arms 16 and by the centre web 14 and second pair of arms 18.

Figure 5:
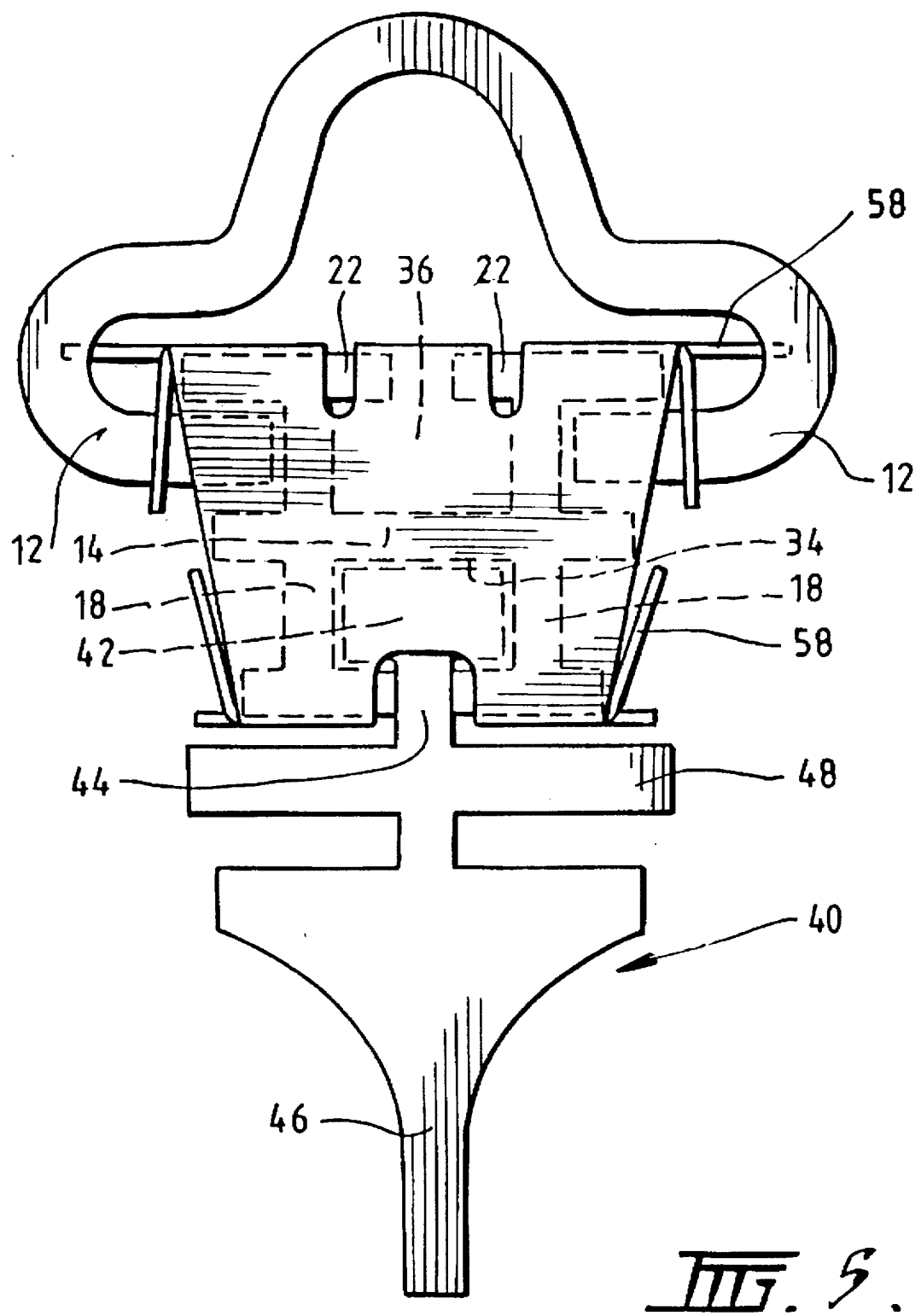
FIG. 5 is a view of a backing strip mounted to a claw of a windscreen wiper blade assembly.
Figure 6:
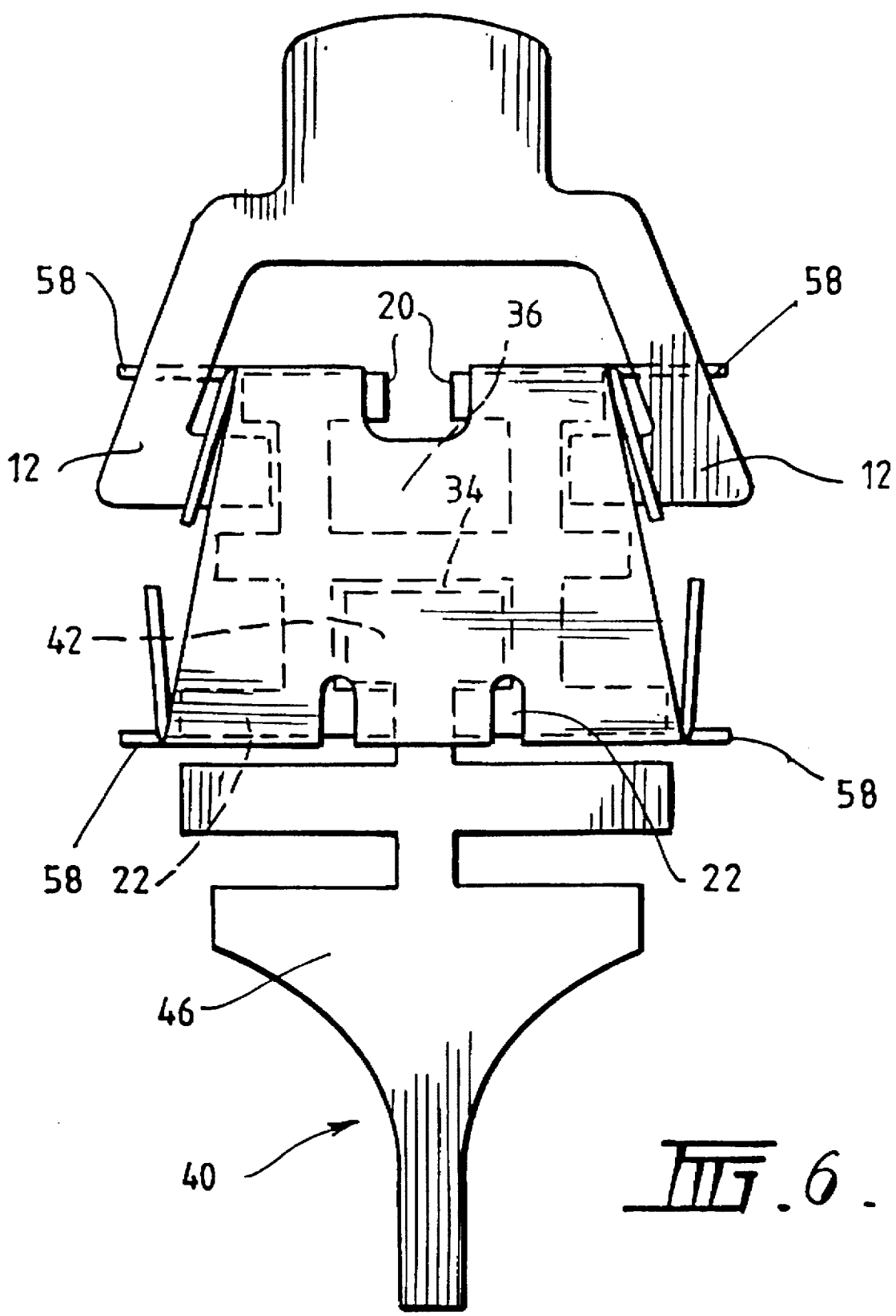
FIG. 6 is a view similar to FIG. 5 showing the alternative mounting of the backing strip.

As is shown in FIGS. 5 and 6, the channels 34 and 36 receive a wiper blade element 40 for wiping the windscreen so that the wiper blade element is securely connected to the backing strip 10. The channels 34 and 36 may have abrasions, barbs or the like (not shown) for releasably securing the wiper blade element 40 in one of the channels 34 or 36.

The backing strip 10 shown in FIG. 1 is a multifit backing strip intended for use with claws which are spaced apart by different distances. Typically, some vehicle manufacturers produce wiper blade frames which have claws which are spaced apart a distance of, for example, 6 mm and others produce wiper blade frames which have claws which are spaced apart by a distance of, for example, 8 mm. Other manufacturers or vehicle models can have a claw spacing of 12.5 mm. The distance between the longitudinal edges 24 of the first pair of rails 20 is intended to match claws which are spaced apart a distance of, for example, 6 mm and the distance between the longitudinal edges 26 of the second pair of rails 22 is adapted to match claws which are spaced apart a larger distance, for example, 8 mm.

When attaching the backing strip 10 shown in FIG. 1 as original equipment on the motor vehicle or removing an existing backing strip and attaching a replacement backing strip the appropriate pair of rails 20 or 22 which match the spacing of the claws 12 are engaged with the claws 12 as shown in FIGS. 5 and 6 so that the rail is slid through the plurality of opposed pair of claws 12 to couple the backing strip 10 to the blade frame of the windscreen wiper blade assembly of the vehicle. The wiper blade element 40 shown in FIGS. 5 and 6 is engaged with the channel 34 or 36 which is arranged outwardly of the claws 12. If necessary the blade element 40 can be moved from one of the channels and inserted in the other channel depending upon which of the rails 20 or 26 are engaged with the claws 12.

As shown in FIG. 5, the rails 22 are engaged with the claws 12 and therefore the blade element 40 is engaged in the channel 34. As shown in FIG. 6 the rails 20 are engaged with the claws 12 and the blade element 40 is coupled with the channel 36. FIG. 5 of the drawings shows claws 12 which are arranged as a clover leaf member whereas the claws 12 in FIG. 6 are rectangular or trapezoidal in cross-sectional shape.

Since the backing strip 10 is engageable with the claws by simply reversing the position of the backing strip and locating the blade element 40 in an appropriate one of the channels 34 or 36 it is not necessary for the unused set of rails to be accommodated within the confines of the claw and therefore the backing strip would readily fit claws regardless of the configuration of the claws or the amount of space within their confines.

As is also best shown in FIGS. 5 and 6, the blade element 40 includes a base portion 42 which is received within the channel 36 or 34, a neck portion 44 which is received in the associated restricted entrance slot 30 and a wiper portion 46 which is adapted to wipe on a windscreen of a vehicle. An intermediate web portion 48 may be arranged between the wiper portion 46 and the neck 44 if desired.

Preferably the rail 10 is formed by extrusion from plastics material and the wiper element 40 is also formed from extrusions from a suitable soft flexible rubber or plastics material.

FIGS. 2, 3, 4 and 7 show a clip 50 which is adapted to be arranged at one end of the backing strip 10 and which is adapted to secure the backing strip 10 to one pair of opposed claws 12 of the blade frame. The clip 50 has a base section 52 which is intended to be arranged adjacent the end of the backing strip 10. A first pair of legs 54 extend transversely, and preferably perpendicular, to the base 52 and are spaced apart by a first predetermined distance. A second pair of legs 56 are generally opposed to the first pair of legs 54 and also extend transverse and, preferably perpendicular, to the base section 52. The second pair of legs 56 are spaced apart a second predetermined distance which is greater than the first predetermined distance at which the legs 54 are spaced.

Each of the legs 54 and 56 is provided with a prong 58 at its end. The prongs 58 have tapered outer side walls 60 for camming engagement with the claws 12 as will be described hereinafter. The legs 54 and 56 also have cutouts 62 arranged between the prongs 58 and the base 52.

A securing tab 64 is arranged between the pair of legs 56 and is adapted to be folded and forced to puncture the centre web 14 of the backing strip 10 in order to secure the clip to the backing strip 10. A suitable tool (not shown) can be used to fold the securing tab 64 into the position shown in FIG. 2 so that portion 64a is driven through centre web 14.

The legs 56 and 54 both have fingers 66 which extend towards one another and transverse to the legs 56 and 54.

Figure 7:
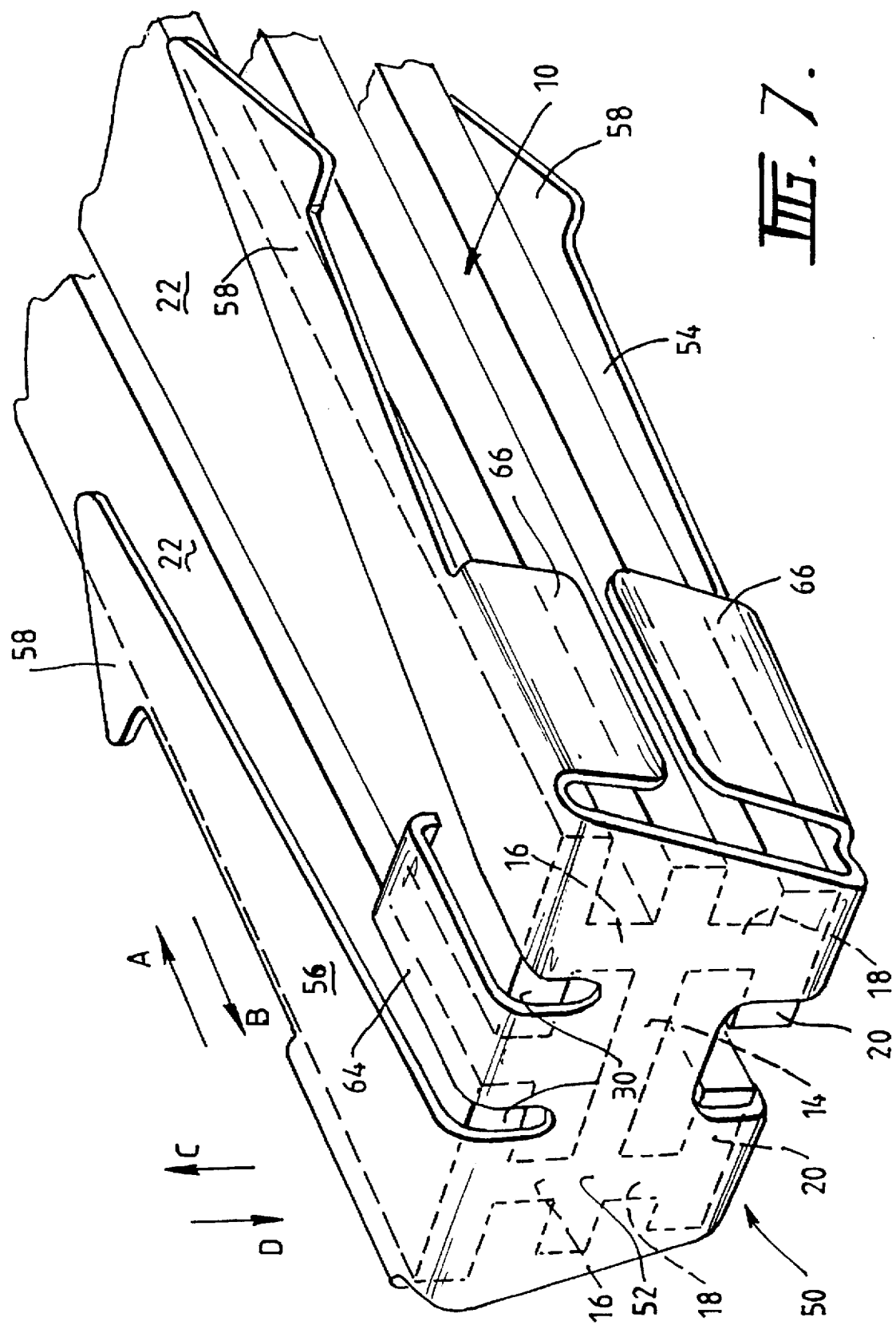
FIG. 7 is a view showing the clip of FIG. 2 mounted on the backing strip of FIG. 1.

As is best shown in FIG. 7, the clip 50 is arranged on the backing strip 10 by locating base section 52 adjacent the end of the backing strip and with the legs 56 overlying the second pair of rails 22 and the first pair of legs 54 overlying the first pair of rails 20, the tab 64 is bent as previously described so that it passes between the flanges 30 and penetrates the centre web 14.

As is shown in FIGS. 5 and 6, when the backing strip is slidably engaged with the claws 12, one of the opposed pair of claws 12 will abut the tapered side wall 60 of the prongs 58 and by camming engagement the legs will flex inwardly so that a continued sliding movement will locate the prongs 58 behind the claws 12 to secure the clip and therefore the backing strip 10 to the claws 12 and therefore to the wiper frame of the wiper blade assembly.

Since the legs 56 and 54 are spaced apart by different distances which correspond with the distance between the longitudinal edges 24 and 26 of the first and second pair of rails 20 and 22 and which in turn match the spacing of claws used with vehicle blade assemblies, the appropriate pair of legs 56 and 54 are spaced to match the claws with which they engage so that the prongs 58 securely engage behind the claws and securely fasten the backing strip to the claws.

The fingers 66 extend downwardly beside the pairs of rails 20 and 22. Thus, the prongs 58 will limit longitudinal movement of the backing strip 10 in the direction of arrow A in FIG. 7 when the prongs 58 are engaged behind the claws 12. Movement in the opposite direction shown by arrow B in FIG. 7 is prevented by virtue of the fingers 66 and the appropriate cutouts 62 engaging the claws 12. Thus, when the claws 12 are located behind the prongs 58 the backing strip 12 is securely located relative to the claws 12 and therefore the blade frame of the wiper blade assembly.

In order to release the backing strip 10 from the blade frame for replacement or maintenance etc, it is only necessary to flex the legs 54 or 56 towards each other so that the prongs 58 are disengaged from behind the claws 12 and the backing strip 10 can then be slid relative to the claws 12 to disengage the backing strip from the claws 12.

The legs 54 or 56 which are not engaged with the claws 12 are protected from the windscreen (not shown) of a vehicle by the wiper blade element 40 and therefore cannot contact the windscreen and scratch the windscreen.

Figure 14:
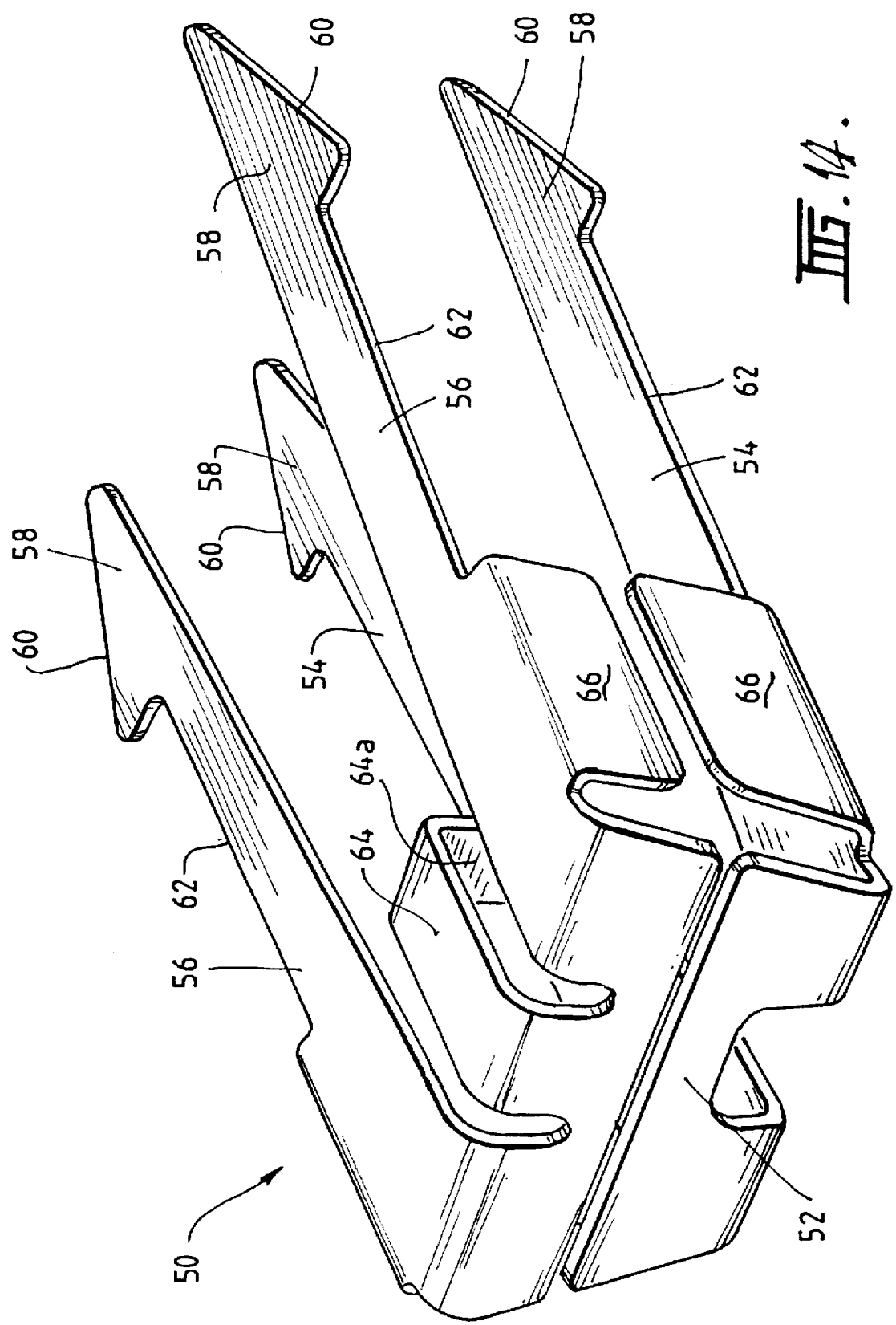
FIG. 14 is a perspective view of a clip according to a further embodiment of the invention.
Figure 15:
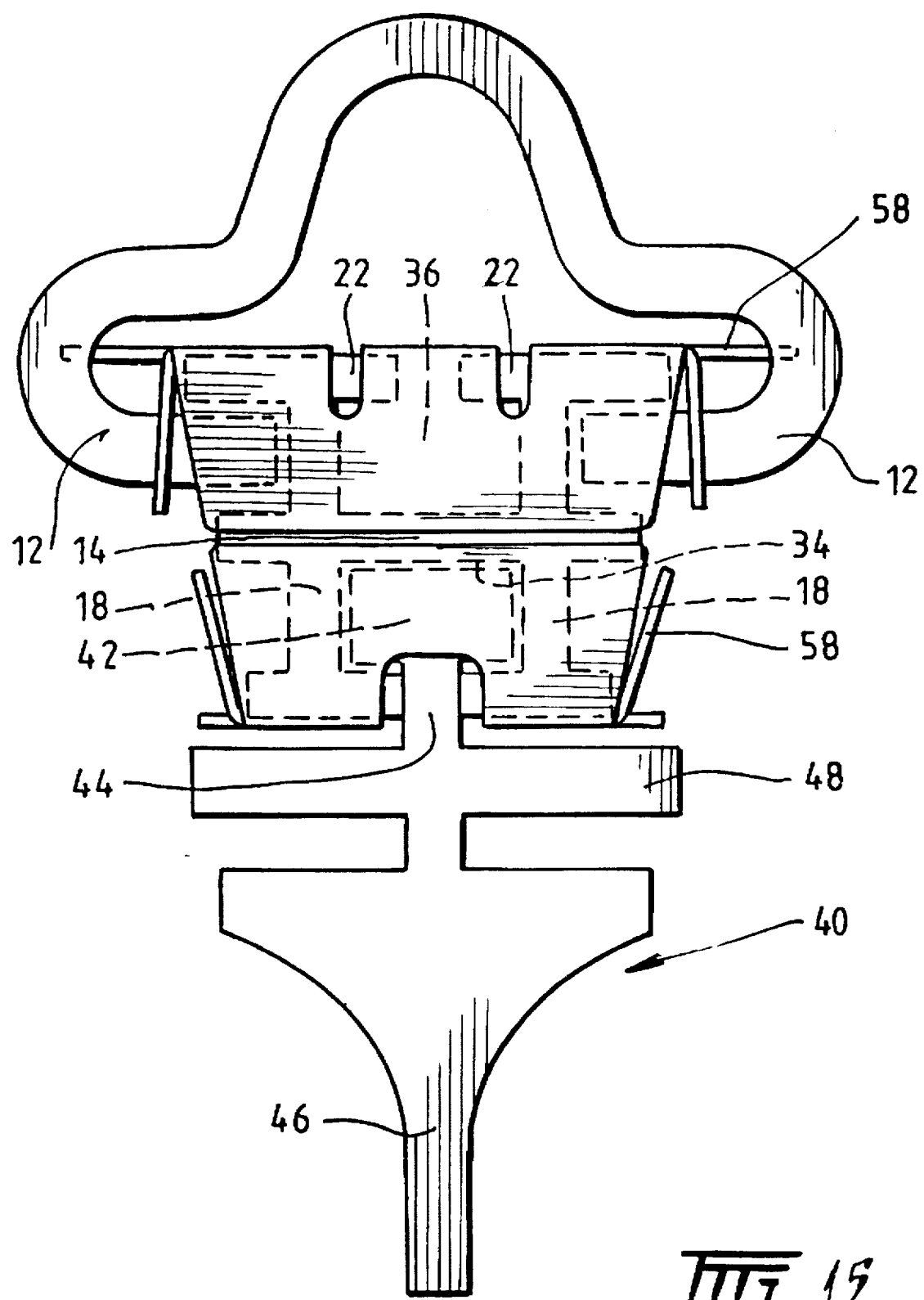
FIG. 15 is an end view of the embodiment of FIG. 14.

In the preferred embodiment of the invention shown in FIGS. 2, 3, 4 and 7, the legs 54 and 56 are integral with the base section 52 and form a single clip. However, in other embodiments, the clip could be formed in two clip halves, each clip half having a respective pair of legs 54 and pair of legs 56. The clip halves would have base sections arranged at the end of the rail but the base sections would not be joined together so the clip halves are effectively separate from one another. This arrangement is shown in FIGS. 14 and 15, as further discussed below.

Figure 8:
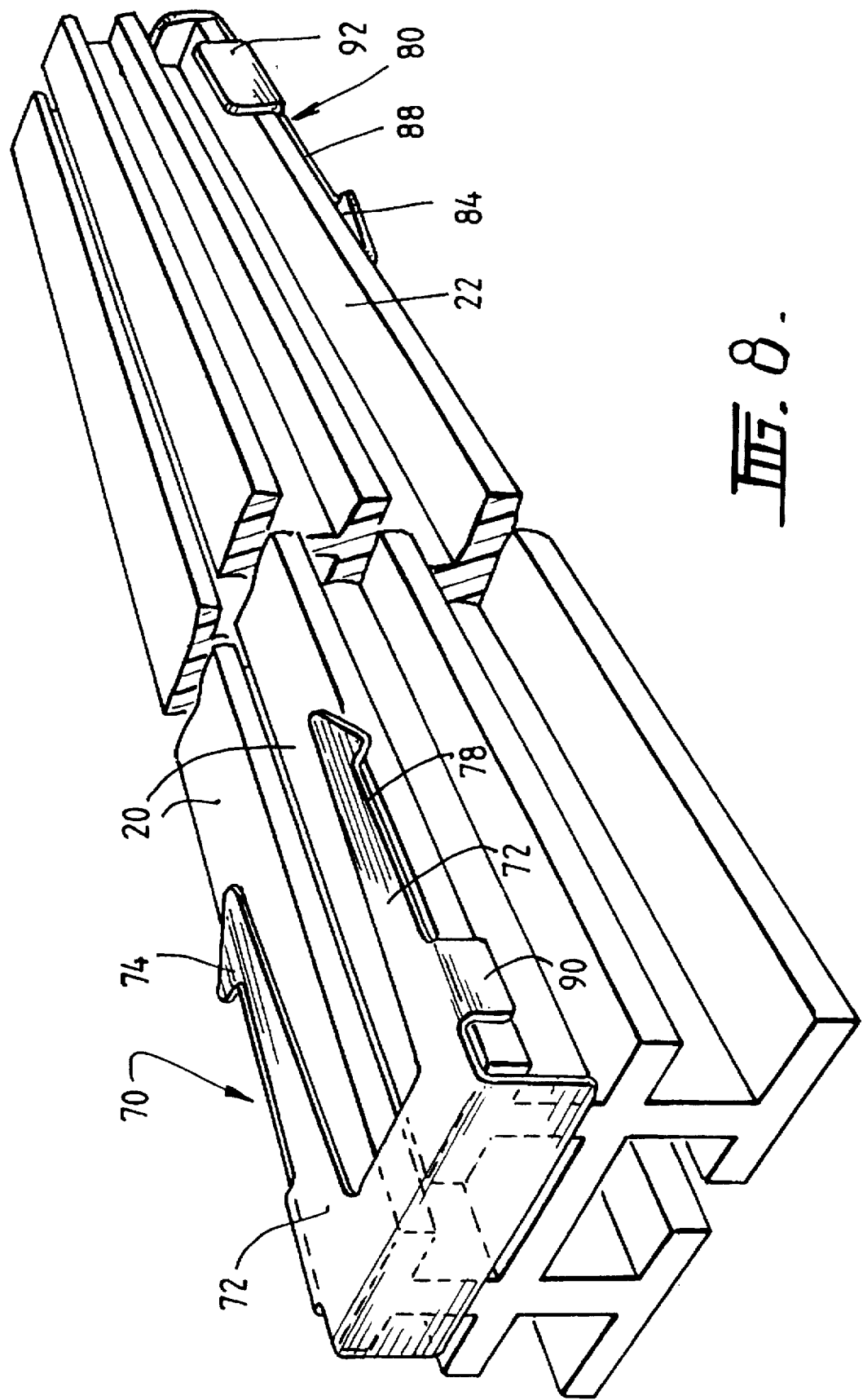
FIG. 8 is a view showing a second embodiment of the invention.
Figure 9:
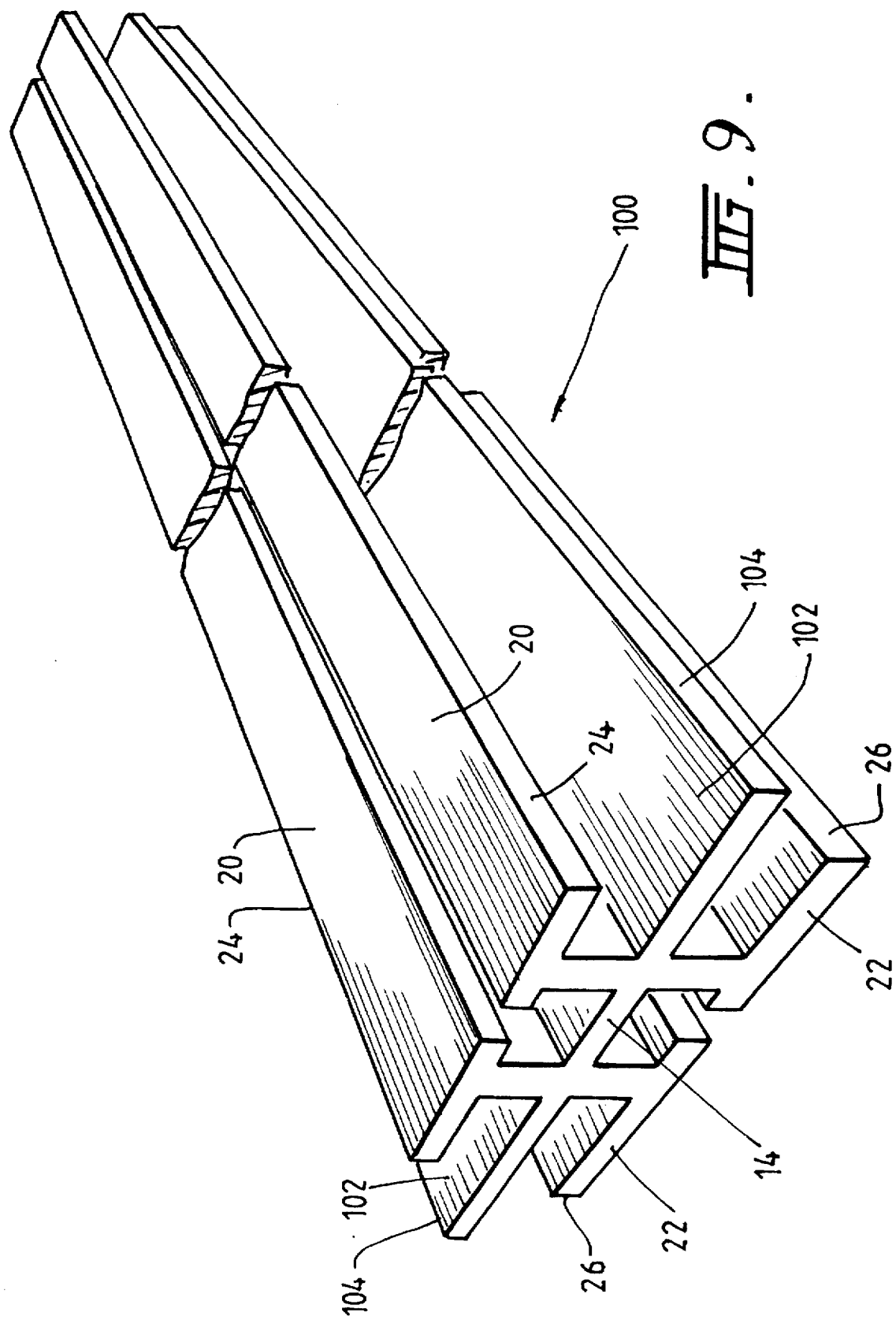
FIG. 9 is a view showing a backing strip according to a third embodiment of the invention.

FIG. 8 shows a second embodiment of the invention in which the backing strip 10 is identical to that previously described. However, in this embodiment two separate clips 70 and 80 are provided at opposite ends of the backing strip 10. One of the clips 70 is engaged with the rails 20 and the other clip is engaged with the rails 22. The clip 70 has a single pair of legs 72 which are of the same structure as the legs described with reference to the clip 50 shown in FIGS. 2 to 7. The legs 72 are spaced apart a first predetermined distance corresponding to the rails 20 and therefore the claws which will engage those rails and legs 82 of the clip 80 are spaced apart a second predetermined distance corresponding to the rails 22 and therefore the claws which will engage that rail. The legs 72 and 82 have prongs 74 and 84 and function in exactly the same manner as the legs of the clip 50. The clips 70 and 80 also have cutouts 78 and 88 and fingers 90 and 92 which function in the same manner as the corresponding fingers and cutouts in the clip 50.

FIGS. 9 to 12 show a second embodiment of a backing strip 100. The backing strip 100 is generally the same as the backing strip 10 and similar reference numerals denote similar parts. However, in this embodiment the centre web 14 is extended outwardly to provide a third pair of rails 102 which have longitudinal edges 104. The longitudinal edges 104 are spaced apart a third predetermined distance corresponding to a third spacing of claws used in vehicle windscreen wiper blade assemblies of, for example, 9.40 mm.

The clip 50 which is generally identical to the clip previously described, is used with the backing strip 100.

Figure 10:
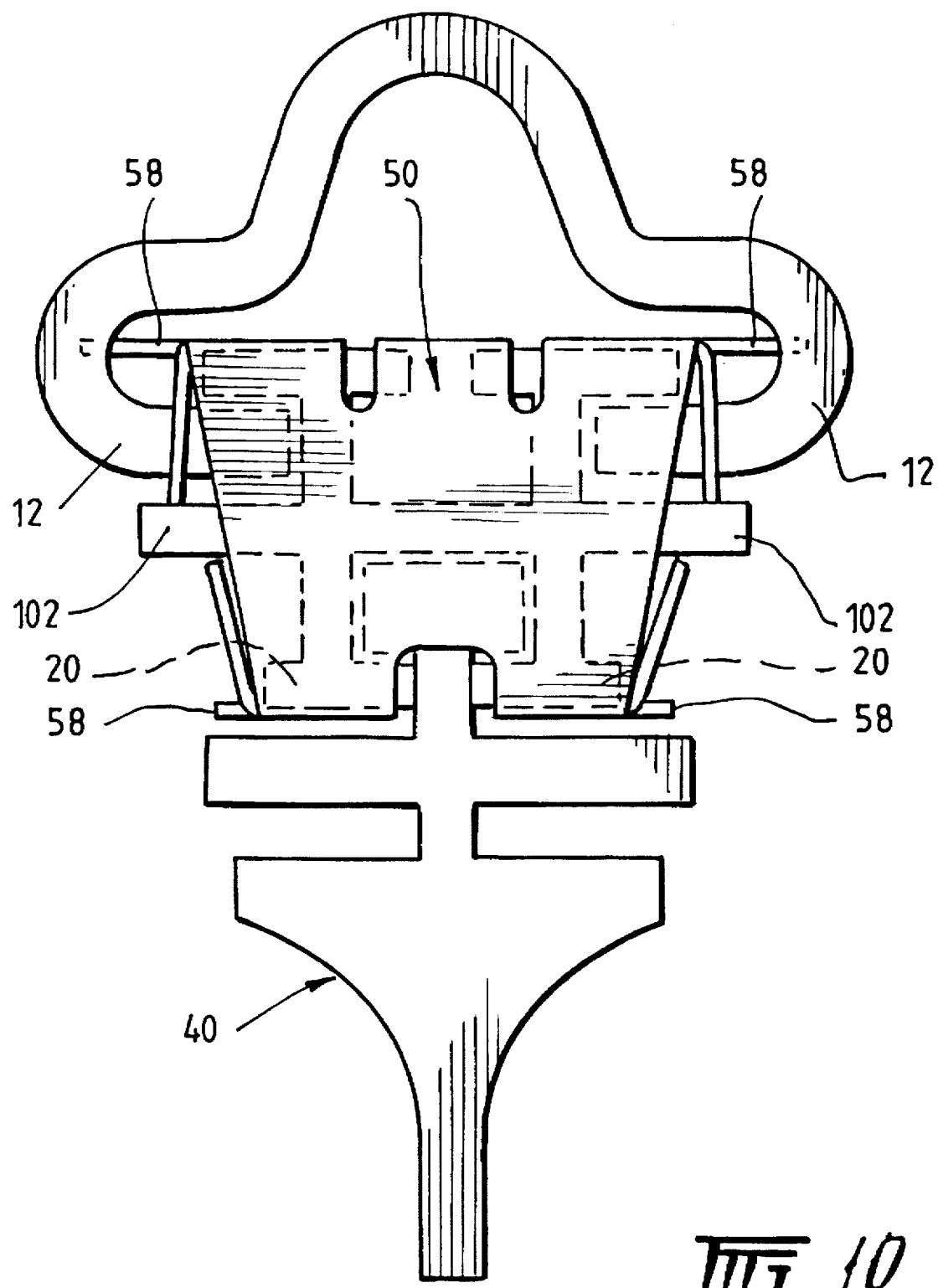
FIGS. 10, 11 and 12 show the backing rail of FIG. 9 engaged with different claws of a windscreen wiper blade assembly.
Figure 11:
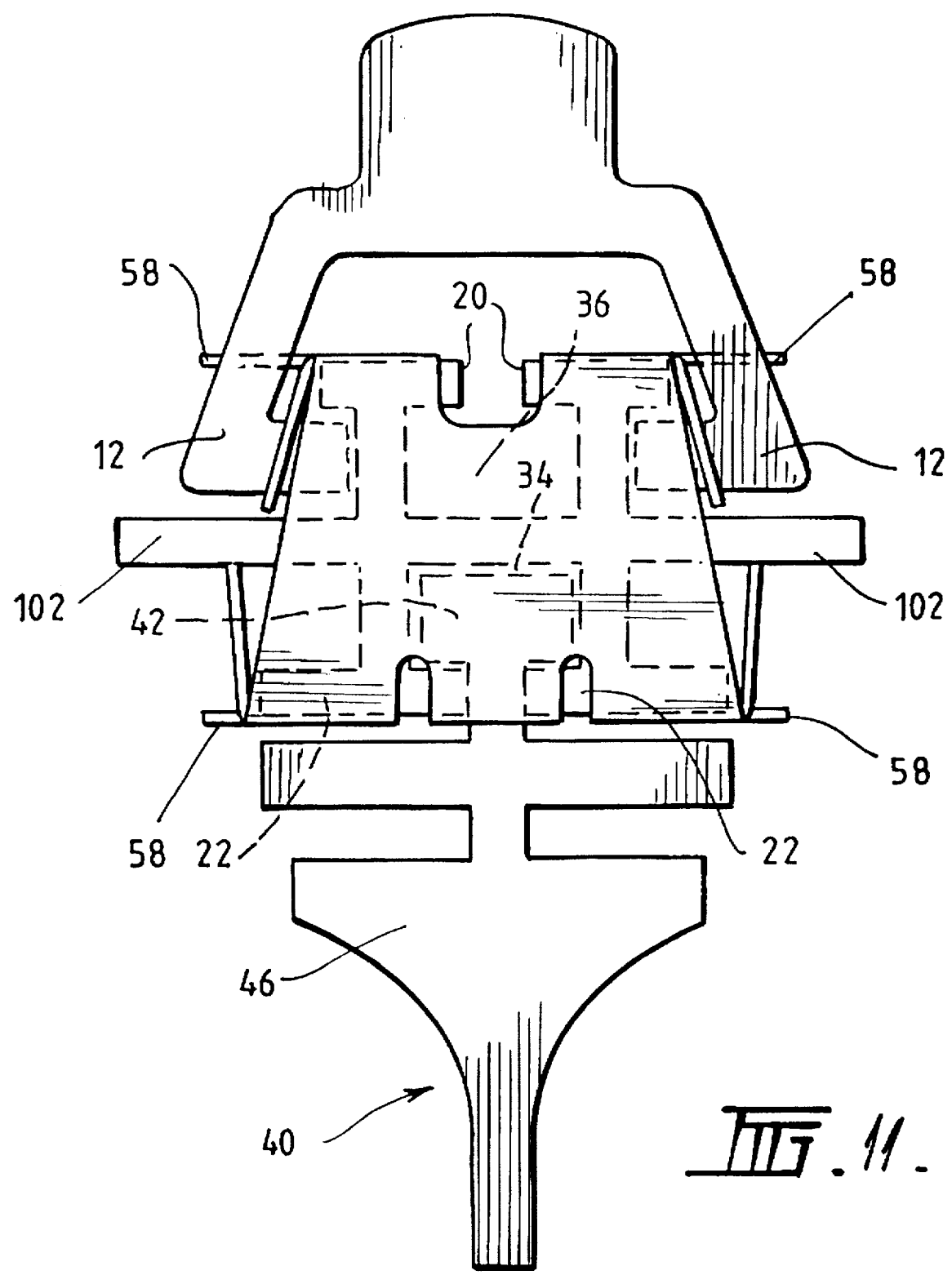

FIGS. 10 and 11 are similar to FIGS. 5 and 6 and show the opposed claws 12 engaged with the rails 20 and 22 and with the appropriate prongs 58 of the clip 50 securing the backing strip 100 to the claws 12. Once again, the wiper blade element 40 is engaged with an appropriate one of the channels 34 or 36 depending upon which of the rails 20 or 22 are engaged with the claws 12.

Figure 12:
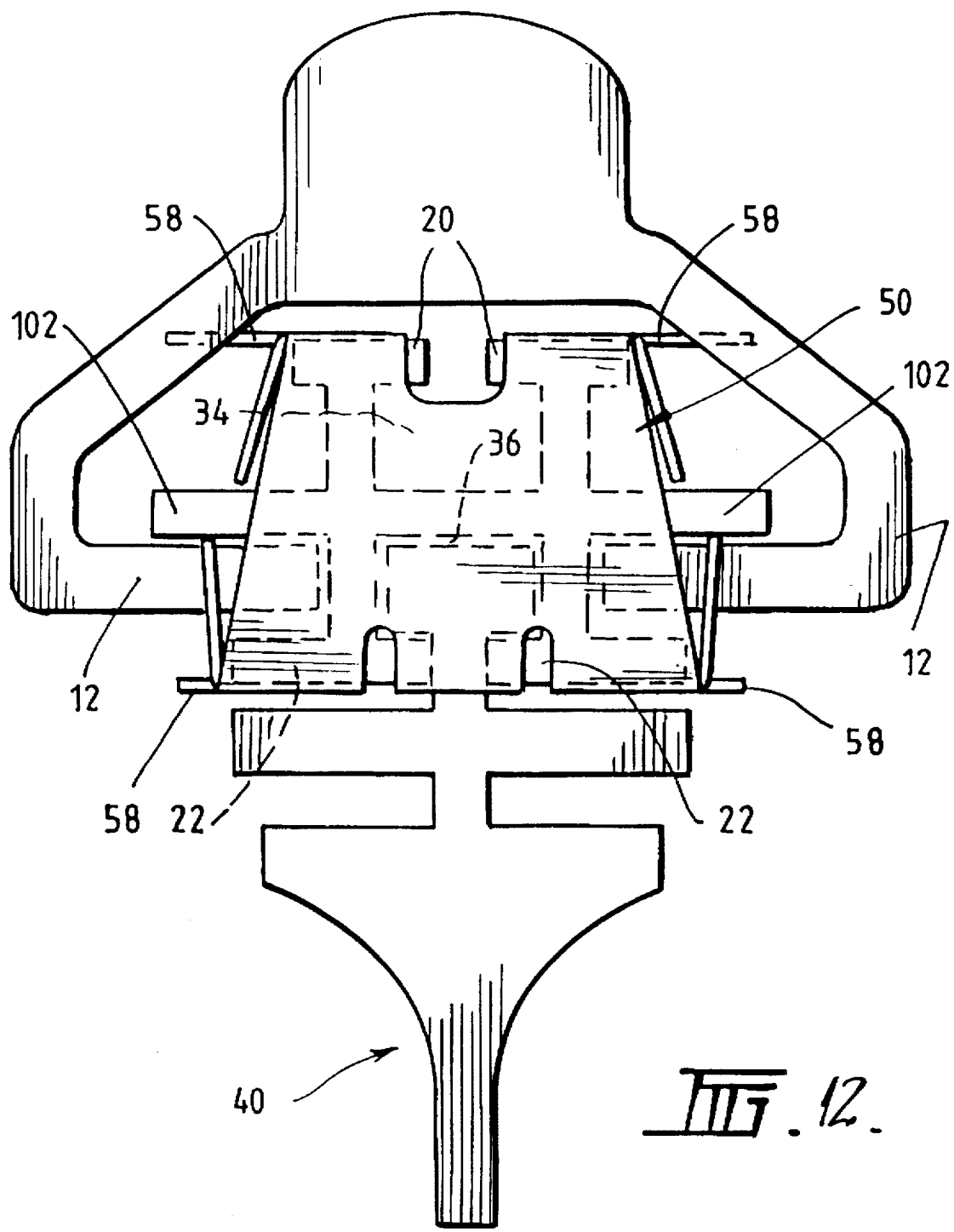

FIG. 12 shows the third pair of rails 102 engaged with the claws 12. When the third set of rails 102 are engaged with the claws 12 it is preferred that the smaller rails 20 bel accommodated within the confines of the claws 12 and that the prongs 58 associated with the first pair of legs 54 engage behind the claws 12 to secure the backing strip 100 in place. However, depending on the configuration of the claws 12 and the amount of space within the confines of the claws 12, the rails 22 could be located within the confines of the claws 12 and the blade element 40 located in the recess 34 instead of in the recess 36. Once again the prongs 58 prevent movement of the backing strip relative to the claws 12 in one direction and the fingers 66 and cutouts 62 prevent movement of the backing strip 100 relative to claws 12 in the opposite direction. Thus, the embodiment of FIGS. 9 to 12 provides three pairs of rails of different spacing for use with three different claw sizes so that the one backing strip can be used with blade frames having three difference claw sizes.

The clip 50 may be secured to the backing strip 10 or 100 by a securing tab which pierces the centre web 14 as previously described or by any other convenient method. For example, a serrated tab or barb could be provided which engages arms 16 or 18 to secure the clip in place, a hole could be punched in the backing strip and a tongue could engage that hole to secure the clip to the backing strip, or a tongue could be provided which includes a hole for receiving a rivet to secure the clip to the backing strip etc.

The clip 50 is securely held to the backing strip 10 and cannot accidentally detached from the backing strip 10 or move to any substantial extent relative to the backing strip 10. When the clip 50 is attached to the backing strip 10, the base section 52 prevents the clip 50 from moving in a first direction shown by arrow B parallel to the longitudinal axis of the backing strip 10. The tongue 64 which engages the backing strip 10 and preferably pierces the web 14 prevents the clip from moving in a second direction A opposite the first direction. The legs 56 prevent the clip 50 from moving in a generally vertical direction shown by arrow C and the legs 54 prevent the clip 50 from moving upwardly in the direction of arrow D. Thus, the clip is securely retained at the end of the backing strip 10.

Figure 13:
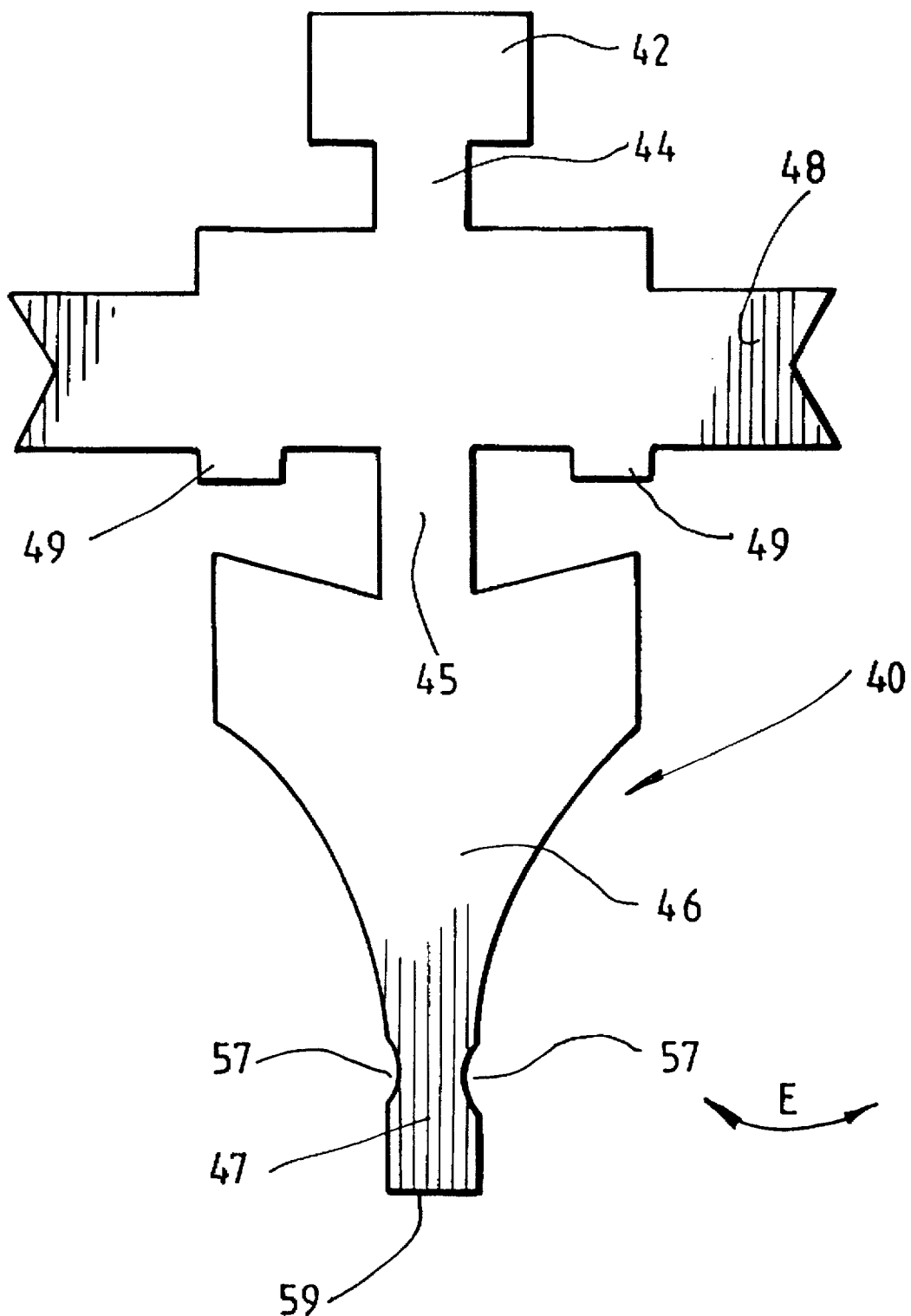
FIG. 13 shows a cross-sectional view of a wiper blade element according to an embodiment of the invention.

FIG. 13 shows a preferred embodiment of the wiper blade element 40 used with the preferred embodiment of the invention. As previously described, the wiper blade element 40 has a base 42, a neck 44, an intermediate wiper portion 48 and a wiper portion 46. The intermediate wiper portion 48 is of substantial thickness and provides a shock absorber or snubber section which absorbs loads applied from the wiper section 46 and reduces the load applied to the wiper blade assembly. Intermediate wiper portion 48 is also provided with a pair of stops 49 which limit the amount of pivotal movement of the wiper portion 46 in the direction of double headed arrow E about hinge portion 45 which extends between the intermediate wiper portion 48 and the wiper portion 46. The stops 49 which limit the amount of pivotal movement of the wiper portion 46 help in the prevention of "set" which is a tendency of the wiper portion to remain pivoted in one direction and not to flip in the opposite direction as the wiper blade commences its return stroke on a windscreen. If the wiper portion 46 remains set, it tends to chisel water from the windscreen rather than wiping the water from the screen which results in increased noise and low cleaning performance. The stops 49 also ensure that the wiping lip 47 is presented at the most desired wiping angle with respect to the windscreen.

The wiper portion 46 is also provided with a pair of score lines or grooves 57 which operate as a further hinge to ensure the tip 47 makes the proper lip angle to the windscreen in either direction. The score lines or grooves 57 also aid in flipping of the wiper portion 46 as the return stroke commences.

The surface of the wiper blade element 40 may be case hardened in a standard chlorination process. The case hardening of the surface of the wiper blade element 40 increases resistance to gouging, cutting and tearing during use and deterioration when the element encounters dust, sand, salt, insects, grime or other harsh substances. Wiper element 40 is normally extruded in the form of two wiper elements 40 being mirror images of one another. The extrusion is cut in half at foot 59 to provide discrete wiper elements 40. The case hardening takes place before cutting of the extrusion so that the foot 59 is not case hardened. This results in the foot being minutely sticky and of a higher friction than the rest of the wiper element. This also assists in flipping of the wiper portion 46 at the commencement of the return stroke of the wiper element because the foot will tend to hold to the glass for a fraction of a second whilst the rest of the system commences its return. The foot 59 in effect becomes a pivot point and thereby enhances the ability of the element 40 to flip in the direction of the return stroke.

Figure 2:
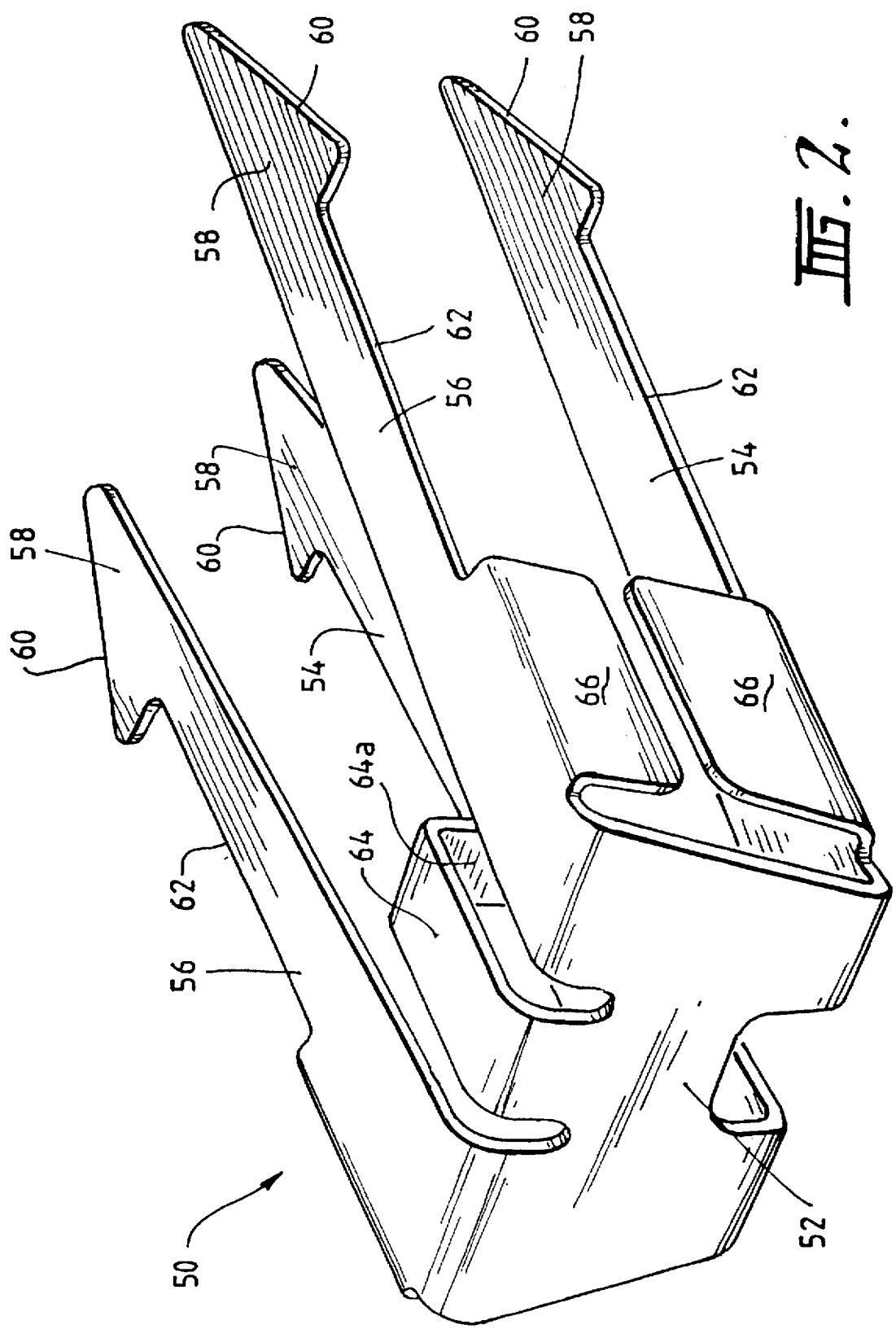
FIG. 2 is a perspective view of a clip according to a first embodiment of the invention.

FIG. 14 is similar to FIG. 2, and FIG. 15 is similar to FIG. 5. However, in the embodiment shown in FIGS. 14 and 15 the clip 50 is divided into two clip halves which are clearly shown in FIGS. 14 and 15, simply by dividing the base 52 by making a cut in the base 52 as shown. Alternatively, rather than dividing a single clip by making a cut in the base 52, the two clip halves could be formed separately from one another. The bottom clip half would also be provided with a tab 64 to enable it to be secured to the backing strip. The tabs 64 need not necessarily be a mirror image of the tabs 64 on the top clip half, and the tabs 64 could extend from another part of the clip half so that it does not interfere with the wiper blade 40 located in the backing strip.

Since modifications within the spirit and scope of the invention may readily be effected by persons skilled within the art, it is to be understood that this invention is not limited to the particular embodiment described by way of example hereinabove.

We claim:

1. A windscreen wiper blade clip assembly and backing strip combination for a windscreen wiper blade assembly having a blade frame including plural pairs of opposed claws, the backing strip being an elongate backing strip having first and second channels for alternatively receiving a wiper blade element, the backing strip having a first pair of rails which include longitudinal edges spaced apart by a first predetermined distance and a second pair of rails coupled to the first pair of rails and having longitudinal edges spaced apart by a second predetermined distance which is greater than the first predetermined distance, the backing strip being coupleable to the blade frame by selectively engaging one of the first and second pair of rails with the opposed claws depending on the size of the opposed claws, and by the blade element being selectively located in one of the first and second channels dependent upon which one of the first and second pair of rails are engaged with the opposed claws, said windscreen wiper blade clip assembly including:

a base section for location at an end of the backing strip;

a first pair of legs coupled to and extending transverse to the base section and overlying the first pair of rails of the backing strip;

a second pair of legs coupled to and extending transverse to the base section and being opposed to the first pair of legs, the second pair of legs overlying the second pair of rails;

abutment members on each of the first and second pair of legs;

wherein dependent on which one of the first and second rails are engaged with the opposed claws, one of the first and second pair of legs which overlie that pair of rails are, in use, engaged with one pair of the opposed claws by location of the abutment members behind said one pair of opposed claws to secure the backing strip to the one pair of opposed claws to limit longitudinal movement of the backing strip relative to the opposed claws;

wherein said windscreen wiper blade clip assembly comprises a first clip and a second clip which is separate from the first clip, each of the first and second clips comprising a portion of said base section, the first clip having said first pair of legs and the second clip having said second pair of legs; and means for attaching each of said clips to the backing strip.

2. The combination of claim 1 wherein, each abutment member is defined by a prong located at an end of each leg in the first and second pair of legs.

3. The combination of claim 2 wherein, the prongs have tapered side edges for camming engagement with the one pair of opposed claws so that the prongs can easily engage behind the one pair of opposed claws.

4. The combination of claim 2 wherein, the first and second pair of legs have cutout sections between the prongs and the base section and fingers arranged transverse to the legs, the fingers being, in use, arranged beside the first and second pair of rails so that the prongs limit movement of the backing strip in one longitudinal direction and the cutout section and fingers limit movement of the backing strip in the opposite longitudinal direction.

5. The combination of claim 1 wherein, the backing strip comprises a centre web, a first pair of arms extending perpendicular to the centre web in a first direction and a second pair of arms extending perpendicular to the centre web in a second direction opposite the first direction, the first pair of rails being arranged at ends of the first pair of arms and extending perpendicular to the first pair of arms and parallel to the centre web, the second pair of rails being arranged at ends of the second pair of arms and being perpendicular to the second pair of arms and parallel to the centre web.

6. The combination of claim 5 wherein, the first and second channels are defined between the first pair of arms and the centre web and between the second pair of arms and the centre web respectively.

7. The combination of claim 1 wherein, the first and second pair of rails have inwardly directed flanges which define restricted entrance slots into the first and second channels.

8. The combination of claim 1 wherein, the blade element has a base portion, a neck portion and a wiper portion, the base portion and the neck portion being a slidable fit into one of the channels and one of the restricted entrance slots and the wiper portion extending outwardly from the backing strip.

9. The combination of claim 1 wherein the first the pair of legs are spaced apart by a first predetermined distance and the second pair of legs are spaced apart a second predetermined distance which is greater than the first predetermined distance at which the first pair of legs are spaced.

10. A backing strip and clip combination for a windscreen wiper blade assembly, the windscreen wiper blade assembly having a blade frame including pairs of opposed claws, the backing strip including:

first and second channels for alternatively receiving a wiper blade element, the backing strip having a first pair of rails which include longitudinal edges spaced apart by a first predetermined distance and a second pair of rails having longitudinal edges spaced apart by a second predetermined distance which is greater than the first predetermined distance, the backing strip being coupleable to the blade frame by engaging either the first or second pair of rails with the opposed claws dependent upon the size of the opposed claws, and by the blade element being located in the first or second channel dependent upon which of the first or second pair of rails are engaged with the opposed claws;

a first clip arranged at one end of the backing strip and having a pair of legs which overlie the first pair of rails, the legs being spaced apart by a first predetermined distance;

a second clip arranged at the other end of the backing strip and having a pair of legs which overlie the second pair of rails, the second pair of legs being spaced apart by a second predetermined distance which is greater than the first predetermined distance at which the first legs are spaced apart;

abutment members on each of the first and second pair of legs of the first and second clips; and wherein dependent upon which of the first or second pair of rails are engaged with the opposed claws, the legs of the first or second clip which overlie that pair of rails are engageable with one of the opposed pair of claws so that the abutment members are arranged behind the said one of the pair of opposed claws to secure the backing strip to the one pair of opposed claws to limit longitudinal movement of the backing strip relative to the opposed claws.

11. A backing strip and clip assembly combination for a windscreen wiper blade assembly, which wiper blade assembly includes plural pairs of opposed claws for engaging the backing strip and holding the backing strip in the wiper blade assembly, said backing strip comprising:

a first pair of claw engageable rails having longitudinal side edges which are spaced apart by a first predetermined distance;

a second pair of claw engageable rails coupled to the first pair of rails and which have longitudinal edges spaced apart by a second predetermined distance, said second predetermined distance being greater than said first predetermined distance;

a third pair of claw engageable rails coupled to the first and second pairs of rails and which have longitudinal side edges spaced apart by a third predetermined distance, said third pair of rails being situated between the first and second pairs of rails, and the first, second and third pairs of rails being substantially parallel, the third predetermined distance being greater than both the first and second predetermined distances;

a centre web;

a first pair of arms extending transverse to the centre web in a first direction;

the first pair of rails being arranged on the first pair of arms;

a second pair of arms extending transverse to the centre web in a direction opposite to the first pair of arms;

the second pair of rails being arranged on the second pair of arms;

a first channel having a restricted entrance slot of reduced width for receiving a blade element and for enabling the blade element to project in a first direction;

a second channel opposed to the first channel and having a restricted entrance slot of reduced width for alternatively receiving the blade element, dependent upon which one of the first, second and third pairs of rails is engaged with the opposed claws, and for enabling the blade element to project in a second direction opposite the first direction;

the first channel being defined between the first pair of arms and the centre web, and the second channel being defined between the second pair of arms and the centre web, wherein the first, second and third pairs of rails enable use of the backing strip with opposed claws of three different sizes; and said clip assembly comprising a first clip having a first base section located at an end of the first pair of rails and a first pair of legs coupled to and extending transverse to the first base section and adapted to overlie the first pair of rails, a second clip separate from the first clip, the second clip having a second base section for location at an end of the third pair of rails, a second pair of legs coupled to and extending transverse to the second base section portion and adapted to overlie the third pair of rails.

12. The backing strip and clip assembly combination of claim 11 wherein the first and second clips are at the same end of the first and third pair of rails.

13. The backing strip and clip assembly combination of claim 11 wherein the first and second clips are at opposite ends of the first and third pair of rails.

14. The backing strip and clip assembly combination of claim 11 wherein the first pair of legs are spaced apart by a first predetermined distance and the second pair of legs are spaced apart by a second predetermined distance which is greater than the first predetermined distance at which the first pair of legs are spaced.

15. A backing strip and clip assembly combination for a windscreen wiper blade assembly which has opposed claws for receiving the backing strip, including:
   an elongate backing strip having at least first and second pairs of rails for engaging the opposed claws of the windscreen wiper blade assembly;
   a clip assembly at one end of the backing strip and having:
   (a) a base section for location at the end of the backing strip, said base section having a surface area;
   (b) a first pair of legs extending from the base section and overlying the first pair of rails of the backing strip, a second pair of legs extending from the base section substantially parallel to the first pair of legs and overlying the second pair of rails, the surface area of said base section being transverse to the first and second pairs of legs and an attachment means coupled to the clip assembly for engaging the backing strip and securing the clip assembly to the backing strip;
   wherein the clip assembly is held firmly to the backing strip by the base section which prevents substantial movement of the clip relative to the backing strip in a first direction parallel to the longitudinal direction of the backing strip, the attachment tongue which prevents substantial movement of the clip assembly away from the backing strip in a direction opposite the first direction, the first pair of legs which prevent substantial movement of the clip assembly in a third direction perpendicular to the longitudinal direction of the backing strip, and the second pair of legs which prevent substantial movement of the clip assembly in a fourth direction perpendicular to the longitudinal axis of the backing strip and opposite to the third direction; and
   wherein said clip assembly comprises a first clip and a separate second clip, the first clip having a first portion of the base section and the second clip having a second portion of the base section, the first clip having the first pair of legs and the second clip having the second pair of legs.

16. A backing strip and clip assembly combination for a windscreen wiper blade assembly having a blade frame including plural pairs of opposed claws, the combination comprising: a backing strip having first and second channels for alternatively receiving a wiper blade element, the backing strip having a first pair of rails which include longitudinal edges spaced apart by a first predetermined distance and a second pair of rails having longitudinal edges spaced apart by a second predetermined distance which is greater than the fist predetermined distance, the backing strip being coupleable to the blade frame by selectively engaging one of the first and second pair of rails with the opposed claws depending on the size of the opposed claws, and by the blade element being selectively located in one of the first and second channels dependent upon which of the first and second pair of rails are engaged with the opposed claws, said combination further including a windscreen wiper blade clip assembly, wherein said clip assembly comprises:
   a base section for location at the end of the backing strip;
   a first pair of legs extending from the base section overlying the first pair of rails of the backing strip;
   a second pair of legs extending from the base section opposed to the first pair of legs the second pair of legs overlying the second pair of rails;
   abutment members on each of the first and second pair of legs;
   attachment means for attaching the clip assembly to the backing strip;
   wherein dependent on which one of the first and second rails are engaged with the opposed claws, one of the first and second pairs of legs which overlie that pair of rails are, in use, engaged with one pair of the opposed claws by location of the abutment members behind said one pair of opposed claws to secure the backing strip to the one pair of opposed claws to limit longitudinal movement of the backing strip relative to the opposed claws; and
   wherein said clip assembly comprises a first clip and a separate second clip, the first clip having a first portion of the base section and the second clip having a second portion of the base section, the first clip having the first pair of legs and the second clip having the second pair of legs.

17. The backing strip and clip assembly combination of claim 16 wherein the first pair of legs are spaced apart by a first predetermined distance and the second pair of legs are spaced apart a second predetermined distance which is greater than the first predetermined distance at which the first pair of legs are spaced.

18. A backing strip and clip assembly combination for a windscreen wiper blade assembly, the windscreen wiper blade assembly having a blade frame including pairs of opposed claws, the backing strip including:
   first and second channels for alternatively receiving a wiper blade element, the backing strip having a first pair of rails which include longitudinal edges spaced apart by a first predetermined distance and a second pair of rails having longitudinal edges spaced apart by a second predetermined distance which is greater than the first predetermined distance, the backing strip being coupleable to the blade frame by engaging either the first or second pair of rails with the opposed claws dependent upon the size of the opposed claws, and by the blade element being located in the first or second channel dependent upon which of the first or second pair of rails are engaged with the opposed claws;
   the clip assembly comprising a first clip arranged at one end of the backing strip and having a pair of legs which overlie the first pair of rails; and a second clip arranged at the other end of the backing strip and having a pair of legs which overlie the second pair of rails;

abutment members on each of the first and second pair of legs of the first and second clips; and wherein dependent upon which of the first or second pair of rails are engaged with the opposed claws, the legs of the first or second clip which overlie that pair of rails are engageable with one of the opposed pair of claws so that the abutment members are arranged behind the said one of the pair of opposed claws to secure the backing strip to the one pair of opposed claws to limit longitudinal movement of the backing strip relative to the opposed claws.

19. A windscreen wiper blade assembly clip and backing strip combination for a windscreen wiper blade assembly having a blade frame including plural pairs of opposed claws, the combination including an elongate backing strip having first and second channels for alternatively receiving a wipe blade element, the backing strip having a first pair of rails which include longitudinal edges spaced apart by a first predetermined distance and a second pair of rails coupled to the first pair of rails and having longitudinal edges spaced apart by a second predetermined distance which is greater than the first predetermined distance, the backing strip being coupleable to the blade frame by selectively engaging one of the first and second pair of rails with the opposed claws depending on the size of the opposed claws, and by the blade element being selectively located in one of the first and second channels dependent upon which one of the first and second pair of rails are engaged with the opposed claws, said combination further including a windscreen wiper blade assembly clip including:

a base section for location at an end of the backing strip;

a first pair of legs coupled to and extending transverse to the base section and adapted to overlie the first pair of rails of the backing strip;

a second pair of legs coupled to and extending transverse to the base section and being opposed to the first pair of legs, the second pair of legs being adapted to overlie the second pair of rails;

abutment members on each of the first and second pair of legs;

attachment means for attaching the clip to the backing strip; and wherein dependent on which one of the first and second rails are engaged with the opposed claws, one of the first and second pair of legs which overlie that pair of rails are, in use, engaged with one pair of the opposed claws by location of the abutment members behind said one pair of opposed claws to secure the backing strip to the one pair of opposed claws to limit longitudinal movement of the backing strip relative to the opposed claws.

20. A backing strip and clip combination for a windscreen wiper blade assembly which has opposed claws for receiving the backing strip, including:

an elongate backing strip having at least first and second pairs of rails for engaging the opposed claws of the windscreen wiper blade assembly;

a clip at one end of the backing strip and having:

a) a base section for location at the end of the backing strip, said base section having a surface area;

b) a first pair of legs extending from the base section and overlying the first pair of rails of the backing strip, a second pair of legs extending from the base section substantially parallel to the first pair of legs and overlying the second pair of rails, the surface area of said base section being transverse to the first and second pairs of legs and an attachment means coupled to the clip for engaging the backing strip and securing the clip to the backing strip; and wherein the clip is held firmly to the backing strip by the base section which prevents substantial movement of the clip relative to the backing strip in a first direction parallel to the longitudinal direction of the backing strip, the attachment means which prevents substantial movement of the clip away from the backing strip in a direction opposite the first direction, the first pair of legs which prevent substantial movement of the clip in a third direction perpendicular to the longitudinal direction of the backing strip, and the second pair of legs which prevent substantial movement of the clip in a fourth direction perpendicular to the longitudinal axis of the backing strip and opposite to the third direction.

21. A backing strip and clip combination for a windscreen wiper blade assembly having a blade frame including plural pairs of opposed claws, the combination comprising: a backing strip having first and second channels for alternatively receiving a wiper blade element, the backing strip having a first pair of rails which include longitudinal edges spaced apart by a first predetermined distance and a second pair of rails having longitudinal edges spaced apart by a second predetermined distance which is greater than the fist predetermined distance, the backing strip being coupleable to the blade frame by selectively engaging one of the first and second pair of tails with the opposed claws depending on the size of the opposed claws, and by the blade element being selectively located in one of the first and second channels dependent upon which of the first and second pair of rails are engaged with the opposed claws, said combination further including a windscreen wiper blade assembly clip, wherein said clip comprises:

a base section for location at the end of the backing strip;

a first pair of legs extending from the base section overlying the first pair of rails of the backing strip;

a second pair of legs extending from the base section opposed to the first pair of legs the second pair of legs overlying the second pair of rails;

abutment members on each of the first and second pair of legs;

attachment means for attaching the clip to the backing strip; and wherein dependent on which one of the first and second rails are engaged with the opposed claws, one of the first and second pairs of legs which overlie that pair of rails are, in use, engaged with one pair of the opposed claws by location of the abutment members behind said one pair of opposed claws to secure the backing strip to the one pair of opposed claws to limit longitudinal movement of the backing strip relative to the opposed claws.

\* \* \* \* \*